UNITED STATES PATENT OFFICE.

MAX C. TRAUB, OF BASEL, SWITZERLAND, ASSIGNOR TO JOHN McKESSON, JR., AND DONALD McKESSON, BOTH OF CHAPPAQUA, NEW YORK, AND WILLIAM HULL WICKHAM, GEORGE C. McKESSON, HERBERT D. ROBBINS, AND IRVING McKESSON, ALL OF NEW YORK, N. Y., COPARTNERS COMPOSING THE FIRM OF McKESSON & ROBBINS, OF NEW YORK, N. Y.

PROCESS OF MANUFACURING ALKYL-ETHERS OF MORPHIN.

1,100,998.  Specification of Letters Patent.  Patented June 23, 1914.

No Drawing.  Application filed May 6, 1912.  Serial No. 695,398.

*To all whom it may concern:*

Be it known that I, MAX C. TRAUB, a subject of the King of Bavaria, residing at Basel, Switzerland have invented certain new and useful Improvements in Processes of Manufacturing Alkyl-Ethers of Morphin, of which the following is a specification.

My invention relates to a process for preparing alkyl ethers of morphin and the object is to provide an economical method of preparing the same.

This process is based on the fact that morphin forms compounds with organic alkyl ammonium bases in solution in a suitable solvent such as alcohol, as it does with sodium, potassium or other bases and that from these compounds under certain conditions alkyl ethers of morphin can be obtained.

The following description of the process relates to the methyl ether of morphin as a type, but any other alkyl ether of morphin can be produced by this process by using the desired organic alkyl ammonium hydroxid.

The process for making the methyl ether of morphin consists in dissolving the molecular quantity of a morphin in an alcoholic solution of the desired organic alkyl ammonium hydroxid, such as trimethyl-phenyl ammonium hydroxid, methyl pyridin ammonium hydroxid $C_6H_5N(CH_3)OH$, tetramethyl-ammonium hydroxid, or other bases of this type, and heating this mixture for several hours on a water bath in a reflux apparatus or in an autoclave. The liquid is allowed to cool and the morphin methyl ether is separated, according to known methods, from the morphin that might have escaped the reaction. For instance, I dissolve 152 parts by weight of trimethyl phenyl ammonium hydroxid in 600 parts of alcohol or some other suitable solvent. In this solution I dissolve 301 parts of morphin and heat the mixture on a water bath in an autoclave or in an apparatus with reflux condenser for several hours. After this time the reaction is complete and the products may be isolated and purified. The chemical reaction is explained by the formula:

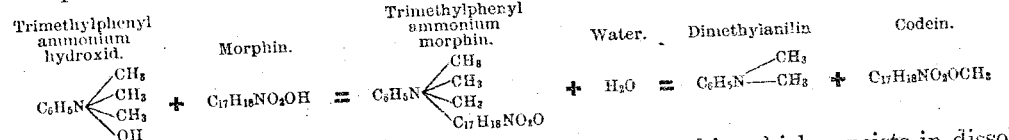

I claim as my invention:—

1. In the process of preparing alkyl ethers of morphin, the step which comprises effecting a reaction between morphin and an organic alkyl ammonium base.

2. In the process of preparing alkyl ethers of morphin, the step which comprises dissolving morphin in a solution of alkyl phenyl ammonium hydroxid.

3. The process of preparing alkyl ethers of morphin, which comprises the dissolving of morphin in a solution of an organic alkyl ammonium hydroxid and heating the solution.

4. The process of preparing alkyl ethers of morphin which consists in dissolving morphin in a solution of alkyl phenyl ammonium hydroxid and boiling the solution for several hours.

5. The process of preparing the methyl ethers of morphin which consists in dissolving morphin in a solution formed by dissolving trimethyl phenyl ammonium hydroxid in a suitable solvent and heating.

6. The process of preparing the methyl ethers of morphin which consists in dissolving morphin in a solution formed by dissolving trimethyl phenyl ammonium hydroxid in a suitable solvent and heating the solution for several hours.

7. The process of making the methyl ethers of morphin which comprises dissolving the molecular quantity of morphin in an organic alkyl ammonium hydroxid and heating the solution for several hours.

8. The process of making the methyl ethers of morphin which comprises the dissolving of morphin in a solution formed by dissolving trimethyl phenyl ammonium hydroxid in a suitable solvent and heating.

9. The process of preparing the methyl ethers of morphin which comprises the dissolving of morphin in a solution formed by dissolving trimethyl phenyl ammonium hydroxid in a solvent and heating the solution for several hours.

This specification signed and witnessed this 14th day of March, A. D., 1912.

MAX C. TRAUB.

Signed in the presence of—
 GEO. GIFFORD,
 ARNOLD ZUBER.